Sept. 19, 1967  H. NEBIKER, JR  3,342,041
HIGH STRESS INSULATED COUPLING
Filed Oct. 19, 1965

INVENTOR.
HERMAN NEBIKER JR.
BY *Merrill Moody*
ATTORNEY

United States Patent Office 3,342,041
Patented Sept. 19, 1967

3,342,041
HIGH STRESS INSULATED COUPLING
Herman Nebiker, Jr., Cedar Rapids, Iowa, assignor to Collins Radio Company, Cedar Rapids, Iowa, a corporation of Iowa
Filed Oct. 19, 1965, Ser. No. 497,669
3 Claims. (Cl. 64—11)

ABSTRACT OF THE DISCLOSURE

This invention relates to a coupling device for joining a pair of shafts so that they are electrically insulated from each other and are capable of transmitting a large amount of torque over an extreme temperature range. It consists of two fork-shaped members with the fingers offset from each other coupled by a resistive insulating shaft through which pins extend to form a unitary unit.

---

This invention relates in general to an insulated flexible coupling and in particular to a coupling for connecting a pair of shafts.

At times it is desirable to have a shaft coupling between members which may have different electrical potential or which are to be insulated from each other. The present coupling consists of a structure which may carry torsion and which maintains insulation between the input and output of the coupling members. A feature of this invention is found in the provision for a pair of fork-shaped members which are connected to a pair of shafts with an insulating shaft held between the fork members by pins to provide connection between the output and input shaft.

An object of this invention is to provide an improved flexible coupling.

Another object of this invention is to provide an improved coupling in which the output and input are electrically insulated from each other.

Figure 1:
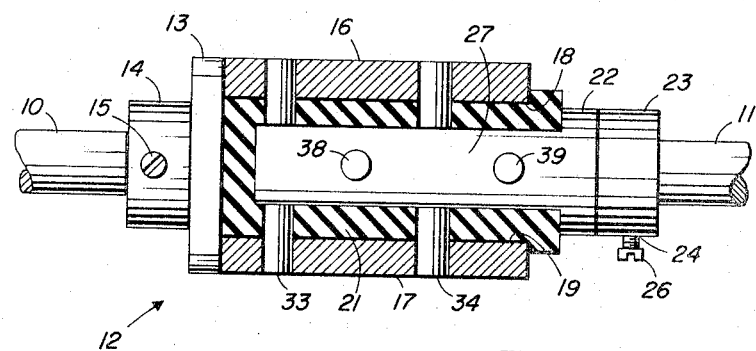
Figure 2:
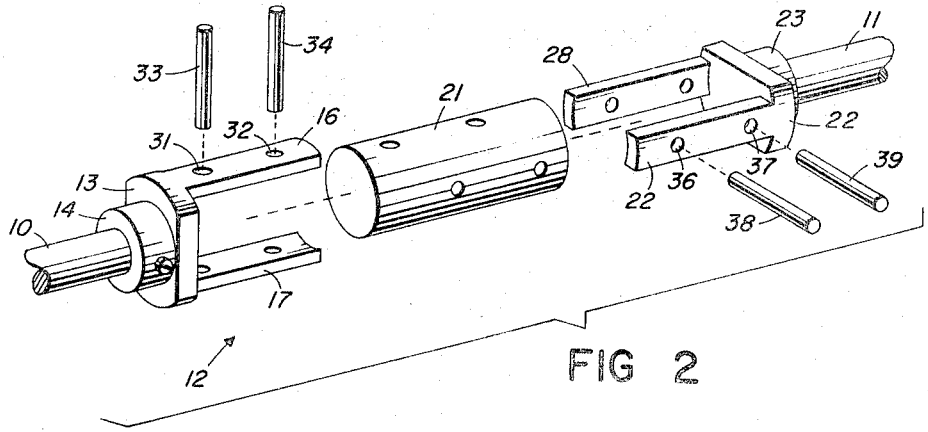

Further objects, features and advantages of this invention will become apparent from the following description and claims when read in view of the drawings in which:

FIGURE 1 is a partially cut away view of this invention in its assembled position, and FIGURE 2 is an exploded view of the coupling.

FIGURE 1 illustrates a pair of shafts 10 and 11 which are to be coupled together by the insulated, flexible coupling 12 of this invention. The coupling 12 consists of a first bifurcated member 13 which is formed with a sleeve 14 into which the shaft 10 extends. The bifurcated member is locked to shaft 10 by set screw 15 which is threadedly received through the collar 14 and locks the member 13 to shaft 10. The bifurcated member 13 has a pair of arms 16 and 17 which are formed with curved inner surfaces 18 and 19 as best shown in the exploded view of FIGURE 2.

A shaft 21 of insulating material is receivable within the bifuracted member 13 between arms 16 and 17 and its outer curved surfaces mate with the curved surfaces 18 and 19 of the arms 16 and 17. The insulating shaft 21 might be constructed of Hi Hemp Phenolic Rod, for example, or of any other suitable insulating plastic.

A second bifurcated member 22 has a collar 23 formed with a threaded opening 24 into which a set screw 26 is received. Collar 23 fits over the end of shaft 11 and set screw 26 locks bifurcated member 22 to the shaft 11. Bifurcated member 22 is formed with a pair of arms 27 and 28 which have their inner surfaces curved so that the insulating shaft 21 may be received therebetween. The arms 27 and 28 fit about shaft 21 so that they are between arms 16 and 17 of member 13. Openings 31 and 32 are formed through the bifurcated arms 16 and 17 and shaft 21 and locking pins 33 and 34 are press-fitted through these openings to lock the member 13 to the insulated shaft 21. Likewise openings 36 and 37 are formed through arms 27 and 28 and the insulated shaft 21 and locking pins 38 and 39 are press-fitted into these openings. It is to be noted that the openings 31 and 32 are offset longitudinally from openings 36 and 37 as well as being at right angles to them to maintain insulation between members 13 and 22.

The insulating shaft fits tightly between arms 16 and 17 and 27 and 28 to assure a tight coupling. The pins 16 through the openings 33, 34, 38 and 39 are press-fitted and thus cause the plastic shaft 21 to flow thus placing it in compression. This gives a much stronger coupling in that plastics are normally much stronger in compression than they are in tension. This allows high torsional stresses to be transmitted. The driving element may take either a lead screw or linear actuator form. It seems that this invention provides a coupling device capable of connecting a pair of shafts together.

Although this invention has been described with respect to particular embodiments thereof, it is not to be so limited as changes and modifications may be made therein which are within the spirit and scope of the invention as defined by the appended claims.

I claim:
1. A coupling device for connecting a pair of shafts comprising a first member formed with an opening into which one of the shafts extends, a slot formed in said first member to form fingers, a second coupling member formed with an opening into which the second shaft extends, a slot formed in the second member to form fingers, a coupling shaft receivable between the first and second coupling members with the members interdigitated such that the fingers of the first member fit into between the fingers of the second member, first means for locking the first coupling member to the coupling shaft, second means for locking the second coupling member to the coupling shaft, said first locking means comprise pins extending transversely through the first coupling member and the coupling shaft, said pins being axially spaced and extending through the fingers of the first coupling member, and the second means for locking comprise pins which pass through the second coupling member and the coupling shaft, said pins being axially spaced and extending through the fingers of the second coupling member.

2. In apparatus according to claim 1 wherein the coupling pins passing through the first coupling member and coupling shaft are longitudinally offset from the pins passing through the second coupling member and coupling shaft.

3. In apparatus according to claim 1 wherein the coupling shaft is made of insulating material.

References Cited

UNITED STATES PATENTS

| 855,106 | 5/1907 | Hensel | 64—2 |
| 2,587,819 | 3/1952 | Camerino | 64—14 |
| 2,639,931 | 5/1953 | Kandle et al. | 287—2 |
| 2,826,052 | 3/1958 | Stillwagon | 64—17 |
| 2,951,354 | 9/1960 | Anderson | 64—14 |
| 3,046,759 | 7/1962 | Deford et al. | 64—11 |

FOREIGN PATENTS

| 963,249 | 7/1964 | Great Britain. |

HALL C. COE, *Primary Examiner.*